United States Patent [19]
Possati, deceased et al.

[11] Patent Number: 5,299,360
[45] Date of Patent: Apr. 5, 1994

[54] PROBE FOR CHECKING LINEAR DIMENSIONS

[75] Inventors: Mario Possati, deceased, late of Bologna; by Gabriella Manfredi, heir; by Alberto Possati, heir, both of Bologna, all of Italy; by Edoardo Possati, heir, Geneva, Switzerland; by Marco Possati, heir, New York, N.Y.; by Stefano Possati, heir, Bologna, Italy; Carlo Dall'Aglio, Volta Reno di Argelato, Italy; Franco Danielli, Zola Predosa, Italy

[73] Assignee: Marposs Societa' Per Azioni, S. Marino di Bentivoglio, Italy

[21] Appl. No.: 768,746
[22] PCT Filed: Feb. 22, 1991
[86] PCT No.: PCT/EP91/00336
§ 371 Date: Oct. 18, 1991
§ 102(e) Date: Oct. 18, 1991
[87] PCT Pub. No.: WO91/14149
PCT Pub. Date: Sep. 19, 1991

[30] Foreign Application Priority Data
Mar. 6, 1990 [IT] Italy .................. 3373 A/90

[51] Int. Cl.⁵ ............ G01B 5/03; G01B 7/03
[52] U.S. Cl. ............................ 33/559; 33/561
[58] Field of Search ........... 33/556, 558, 559, 561, 33/503

[56] References Cited
U.S. PATENT DOCUMENTS

| | | |
|---|---|---|
| 3,520,063 | 7/1970 | Rethwish et al. ............... 33/558 |
| 4,187,614 | 2/1980 | Abiru et al. ...................... 33/559 |
| 4,288,925 | 9/1981 | McMurtry . | |
| 4,477,976 | 10/1984 | Suzuki . | |
| 4,523,382 | 6/1985 | Werner et al. .................. 33/556 |
| 4,549,356 | 10/1985 | Ernst ........................... 33/559 X |
| 4,941,266 | 7/1990 | Bissegger et al. ................ 33/556 |

FOREIGN PATENT DOCUMENTS

| | | |
|---|---|---|
| 0093299 | 11/1983 | European Pat. Off. . |
| 0101858 | 3/1984 | European Pat. Off. . |
| 0332575 | 9/1989 | European Pat. Off. . |
| 3424282 | 1/1986 | Fed. Rep. of Germany ........ 33/503 |
| 3902858 | 8/1990 | Fed. Rep. of Germany ........ 33/503 |
| 2375580 | 7/1978 | France . |
| 0124902 | 7/1983 | Japan .................... 33/559 |
| 0030001 | 2/1984 | Japan .................... 33/556 |
| 2094979 | 9/1982 | United Kingdom ............ 33/558 |

Primary Examiner—William A. Cuchlinski, Jr.
Assistant Examiner—Alvin Wirthlin
Attorney, Agent, or Firm—Stevens, Davis, Miller & Mosher

[57] ABSTRACT

A probe comprises a support casing, a movable arm-set with an arm carrying a feeler and a detection device providing a signal further to contact occurring between the feeler and the workpiece. In order to enable the feeler to perform translation displacements along a longitudinal geometrical axis and rotations about transversal axes, the matching between the support casing and the arm-set is obtained by means of a cone-shaped surface, a spherical surface and a spring urging these surfaces into contact. An annular reference surface of the movable arm-set enters into contact with an annular plane surface of the support casing when a first eccentricity value of the feeler, with respect to the longitudinal geometrical axis, is reached, and when a second eccentricity value is reached the signal of the detection takes a determined value.

16 Claims, 3 Drawing Sheets

PROBE FOR CHECKING LINEAR DIMENSIONS

DESCRIPTION

1. Technical Field

The invention relates to a probe for checking linear dimensions of workpieces on machine tools or measuring machines, comprising a support casing that defines a first reference surface with circular symmetry; a movable structure including a second reference surface with circular symmetry, and an arm carrying a feeler for touching the surface of the workpiece to be checked, the movable structure being apt to assume a central position in which at least one portion of the movable structure is substantially arranged along a longitudinal geometrical axis; detection means for providing a signal depending on the position of the movable structure; and thrust means located between the support casing and the movable structure for biasing the first and second reference surfaces towards each other; and in which said portion of the movable structure can accomplish limited translation displacements along said longitudinal geometrical axis and limited rotational displacements about geometrical axes lying in any whatever direction perpendicular to the longitudinal geometrical axis direction.

2. Background Art

Contact detecting and measuring heads or probes are used on coordinate measuring machines and machine tools, more specifically, machining centres and lathes, in order to accomplish checkings on machined—or to be machined—workpieces, tools, machine tables, etc. Generally, these heads comprise a movable arm carrying one or more feelers and a detection circuit with one or more switches or position transducers.

In the case of contact detecting probes, the touch of the feeler on the workpiece causes, after a possible pre-stroke, the switching of the detection circuit that in turn controls the reading of transducers associated with the machine slides and that provide measuring values with respect to a reference position or point. The essential requirements of these heads are repeatability—i.e. the correspondence between determined positions of the feeler and the switching of the detection circuit, or, in the case of the measuring heads, the signal values of the transducers in the heads -, sturdiness, small overall dimensions and limited costs.

According to the degrees of freedom of the movable arm-set, and consequently to the displacements that the feeler can accomplish, there can be distinguished heads with one or more axes.

Referring, for the sake of simplicity, to contact detecting heads equipped with a movable arm and an associated feeler that in rest conditions are aligned along a longitudinal geometrical axis of the head, in the major part of the applications there are used omnidirectional heads—sometimes improperly referred to as "3-axis" heads—in which the feeler can accomplish displacements along the longitudinal geometrical axis as well as displacements along any whatsoever transversal direction (perpendicular to the longitudinal axis). Normally the transversal displacements are not plain translations, but rotational movements of the movable arm-set about transversal geometrical axes.

Most of the known probes are anisotropic as far as the switching of the detection circuit—occurring as a consequence of transversal displacements of the feeler—is concerned. In other terms, as the direction of the transversal displacement varies, the switching of the circuit occurs in correspondence with different eccentricities of the feeler with respect to the longitudinal geometrical axis.

U.S. Pat. No. US-A-4477976 discloses contact detecting heads according to the prior art portion of claim 1, that have a structure for reducing, at least in part, the anisotropy as the transversal measurement direction changes These heads comprise an annular plate secured to the head casing and having an annular shaped projection, and a plane annular flange secured to the movable arm-set that comprises the arm carrying the feeler.

The casing and the movable arm-set carry a pair of electrical contacts that are arranged, in rest condition, according to the longitudinal geometrical axis of the head. The rest condition is defined by a spring (also arranged. according to the longitudinal geometrical axis), that urges the annular flange to contact the annular projection and keeps the two electrical contacts in contact with each other.

Undesired transversal displacements of the annular flange can be limited only at the cost of non negligible inconveniences. In fact, apparently, these transversal displacements are only limited because of the small radial clearance existing between flange and casing. However, it is clear, that the smaller the radial clearance is, the greater are the frictions that can occur between the edge of the flange and the head casing. The actual isotropy of the head in the case of measurements in a transversal direction thus appears quite dubious and the achievable repeatability does not appear high.

DISCLOSURE OF INVENTION

Object of the invention is to provide a contact detecting, or measurement head or probe with an isotropic behaviour for checkings occurring in a transversal direction and that guarantees a high degree of repeatability, robustness, constructional simplicity and limited cost.

A probe according to the invention comprises a support structure, or casing, that defines a first reference surface with circular symmetry; a movable structure or arm-set, forming a second reference surface with circular symmetry and an arm carrying a feeler; detection means for providing a measurement or switching signal depending on the position of the movable arm-set; and thrust means for resiliently biasing said first and second reference surfaces towards each other. Two further reference surfaces, associated with the support structure and the movable arm-set and biased against each other by the thrust means, substantially define a spherical hinge. Further to the mutual approach between the head and the workpiece, in a transversal direction, the feeler touches the surface of the workpiece.

Then, the movable arm-set initially rotates about the centre of the spherical hinge until the first and the second reference surfaces contact each other. The further movement of the movable arm-set consists in rotational displacements about a transversal geometrical axis passing through a point lying in a circumference located in a plane perpendicular to the longitudinal geometrical axis of the head. This configuration ensures isotropy with respect to checkings in a transversal direction and excellent repeatability.

The presence of a spherical hinge, that can be constructed by means of a truncated cone surface and a convex surface with rotational symmetry, with respect to a longitudinal geometrical axis, prevents undesirable transversal translations of the movable arm-set. The first and the second surfaces with circular symmetry, in combination with the spherical hinge and with a suitable geometry, provide an isotropic behaviour in the transversal directions.

With regard to the isotropy effects, it is preferable to provide the thrust means under the form of a spring arranged along the longitudinal geometrical axis of the head and, in the case of a contact detecting head, use a switch with two electrical contacts, or two contact systems, also substantially arranged along the longitudinal geometrical axis. In order to prevent rotations of the movable arm-set about the longitudinal geometrical axis, there can be foreseen, between the support casing and the movable arm-set, an antirotation device for opposing a suitable resistance to torsional forces and a negligible resistance with respect to the other forces deriving from the contact occurring between the filler and the workpiece.

BRIEF DESCRIPTION OF DRAWINGS

The invention is now described in more detail with reference to the enclosed drawings, given by way of non limiting example, in which.

BEST MODE FOR CARRYING OUT THE INVENTION

Figure 1:
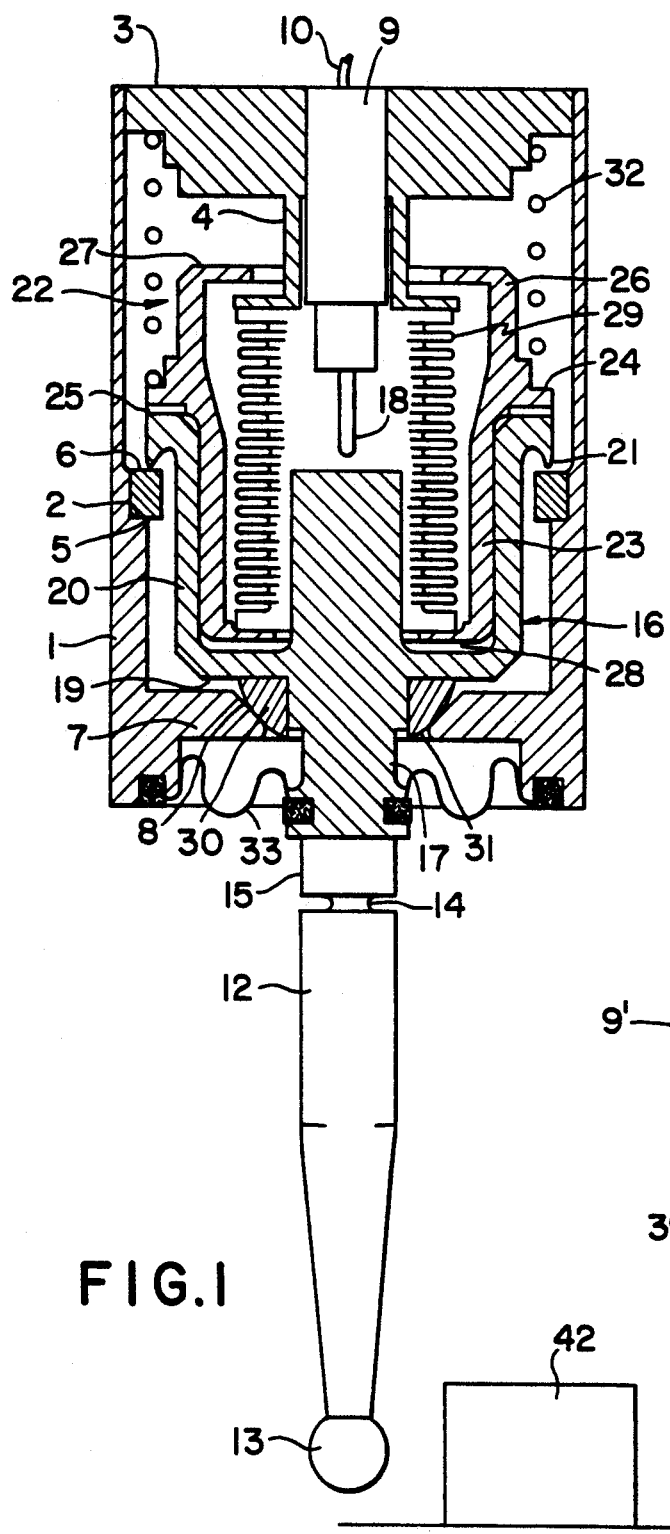
FIG. 1 is a longitudinal cross-sectional view of a probe, i.e. a measuring head or a contact detecting head, according to the preferred embodiment of the invention.

The head or probe shown in FIG. 1 comprises a support casing including a member or element 1, of a substantially tubular shape, a ring 2, a circular closure plate 3 and another element 4.

Ring 2 is clamped, in a way that is not shown, coaxially with respect to the longitudinal geometrical axis defined by member 1, in correspondence with a shoulder 5, and has external and internal cylindrical surfaces and plane upper and lower annular faces. Upper face 6 forms a reference surface, whose function will be explained hereinafter. In the lower part of member there is a flange 7 (or there is fixed a disc), of a substantially annular shape, that has a central opening. In correspondence with the central opening, flange 7 has a reference surface or seat 8, of a truncated cone shape, widening towards the interior of the head.

Closure plate 3, that has a substantially circular shape, is sealingly secured, in a dismantable way, to the upper end of member 1 and supports a detection device 9, located along the longitudinal geometrical axis. Detection device 9 is sealingly housed in a hole at the centre of plate 3, and clamped to it by means of an axial adjustment and locking device, not shown in the drawings. A cable 10 connects the detection device 9, possibly by means of wireless transmission means, interface devices, etc., to a control and measurement-detecting unit. Threaded holes and possibly datums, not shown, are formed in plate 3 for coupling the head to another support. This support can house, for example, electric components, like a power supply battery, interfaces, transmission units and can comprise a cone shank or a coupling of another type for locking the head in working conditions. These elements are of a known type and not directly concerned with the invention, consequently they are not shown in FIG. 1, nor—for the same reasons—in FIGS. 3 and 4.

Element 4 is also coupled to plate 3, in a way that is not shown in the drawings, and has a tubular portion and an annular flange, that are coaxial with the longitudinal geometrical axis of the head.

The movable arm-set of the head comprises an arm 12 bearing at its free end a feeler 13, for example with a spherical shape. Arm 12 has a sacrificial portion 14, with a thinner section to provide a preferential breakage point, near the upper end 15, which is fixed in a removable way (this has not been shown in figure for the sake of simplicity) to a member 16 with a substantially symmetric bell shape. Member 16 comprises a stem 17, with a lower end coaxially coupled to arm 12, an upper end that can contact a movable stem 18 of the detection device 9, and an intermediately located base or transversal flange 19 coupled to a basically cylindrical portion 20, thus forming the previously mentioned substantially bell shape.

The free end of portion 20 has a convex shape, with decreasing thickness, and ends with an annular reference surface 21 (conceptually a circumference). Under the condition shown in FIG. 1, i.e. when the movable arm-set is in a central position and its axis of symmetry (in particular the axis of arm 12) lies on the longitudinal geometrical axis defined by member 1, the annular surface 21 is at a determined distance from the upper face 6 of ring 2. This distance, that can be in the order of a hundredth of a millimeter, is exaggeratedly shown in FIG. 1, for illustration purposes.

With reference to the condition shown in FIG. 1, an identical distance separates the bottom end of the movable stem 18 from the plane summit surface of the upper part of stem 17.

A cylindrical casing 22 comprises a lower portion 23, inserted with a small amount of clearance within portion 20, an intermediate flange 24, that contacts, by means of a friction device 25—schematically shown—, a substantially annular and plane upper part of member 16 and an upper portion 26. Casing 22 defines bases 27 and 28 with holes for the passage of detection device 9, element 4 and the upper end of stem 17. Lower base 28 of casing 22 defines an annular flange to which there is fixed, for example welded, the lower end of a metal bellows 29. The upper end of the metal bellows 29 is fixed in a similar way to the annular flange of element 4.

In correspondence with the lower surface of base or flange 19 and the adjacent cylindrical surface of stem 17 there is fixed, for example welded, a reference element 30 that defines an external reference surface 31 featuring a convex shape and rotation symmetry with respect to the longitudinal geometrical axis defined by arm 12 and member 16. For example, as shown in FIG. 1, surface 31 can have the shape of a spherical zone.

A helical spring 32 has its upper end abutting against a seat formed in the lower base of plate 3 and its lower end abutting against an annular shoulder defined by flange 24 of casing 22. Spring 32 urges flange 24 to contact, through friction device 25, the upper part of member 16 and consequently the reference surface 31 is urged against the surface or seat 8. When these two surfaces 8, 31 remain in contact, they substantially define a spherical hinge with a central point lying on the longitudinal geometrical axis defined by member 1.

An annular protection and sealing membrane 33 has external and internal rims clamped to annular seats formed in the lower base of member 1 and in the lower end of stem The head shown in figure is preferably used as a contact detecting head. In this case the detection device 9 is made as the switch device 9' schematically shown in FIG. 2.

Device 9' is of a known type and comprises a casing 34, with a substantially cylindrical shape and made of an electrically insulating material, defining a first cylindrical hole 35 housing—with a small radial clearance—an electrically conductive ball 36.

A helical compression spring 37 has its upper end in abutment with a closure cap 38, made of insulating material and coupled to the upper base of casing 34, and the lower end in abutment with ball 36. Spring 37 urges ball 36 in abutment with two transversal cylindrical bars 39, 40 made of an electrically conductive material and clamped to seats formed at the interior of casing 34. Bars 39, 40 are connected with associated electric wires—not shown—, that form part of the detection circuit and extend out of the head through cable 10. The lower portion of ball 36 matches to movable stem 18, that is made of insulating material and is axially guided by a hole 41.

The operation of the head shown in FIG. 1, when it is equipped with a detection device 9', is as follows.

In rest conditions, as already mentioned, the surfaces 8 and 31 are in contact and the movable arm-set substantially assumes the position shown in FIG. 1. However, it is possible without incurring drawbacks of any type, that the movable arm-set and more specifically arm 12, be slightly tilted with respect to the longitudinal geometrical axis defined by member 1.

Further to the mutual approach occurring between the head and the workpiece 42 shown in FIG. 1, feeler 13 contacts the workpiece. In the event the head is installed on a machining centre or a coordinate measuring machine, the head can be fixed to the spindle and the workpiece can be placed on the machine table. As the mutual transversal displacement of the head and the workpiece 42 continues, the movable arm-set initially rotates about the centre of the spherical hinge 8, 31 until a point of the surface 21 contacts the upper face 6 of ring 2. Under this condition contact occurs in correspondence with the portions of surface 21 and ring 2 shown at the right of FIG. 1. The further mutual transversal displacement between the head and the workpiece 42 causes the rotation of the arm-set about the geometrical axis that is perpendicular to the plane of the drawing and passes through the contact point between surface 21 and ring 2. This is also achieved by a suitable geometric configuration: the cone defined by the circumference of base 6 facing the circumference 21 and by the centre of spherical hinge 8, 31 has its generatrices at right angles with respect to the surface of rest cone or seat 8.

By virtue of these kinematic conditions, the centre of instantaneous rotation of the movable arm-set remains substantially coincident with the aforementioned contact point between surface 21 and ring 2. Consequently, the arc of surface 31, shown at the left in FIG. 1, tangentially moves with respect to the adjacent generatrix of seat 8 and the arc shown at the right in the figure substantially displaces along a direction that is perpendicular to the generatrix of seat 8 corresponding to the portion of the seat shown at the right in the figure.

This rotation movement causes the upper end of stem 17, that under rest conditions lies—at least approximately—in the same geometrical plane as the upper surface 6 of ring 2, to displace, substantially, in a vertical direction until it contacts the lower end of stem 18, thus causing the detaching of ball 36 from bars 39, 40, the opening of the corresponding switch (closed under rest conditions) and the detecting of contact between feeler 13 and workpiece 42, upon completion of the previously described pre-stroke.

By virtue of the described geometrical configuration, the pre-stroke is constant (starting from the condition shown in FIG. 1) regardless of the transversal approach direction between the head and the workpiece 42. In other words, contact between surface 21 and ring 2 occurs (in a point of a circumference, on the upper face 6 of ring 2, concentric with the longitudinal geometrical axis) at a determined eccentricity value of feeler 13 with respect to the longitudinal geometrical axis and the opening of switch 36, 39, 40 at another determined eccentricity value of feeler 13 (or of the inclination of the axis of symmetry of arm 12, or the movable arm-set, with respect to the longitudinal geometrical axis).

When feeler 13 is initially arranged above workpiece 42 and the approach movement occurs in the longitudinal geometrical axis direction, the displacement of the movable arm-set is substantially a translation along the same axis. In this case there firstly occurs the detaching of the surfaces 8 and 31 and subsequently the opening of switch 36, 39, 40.

Figure 2:
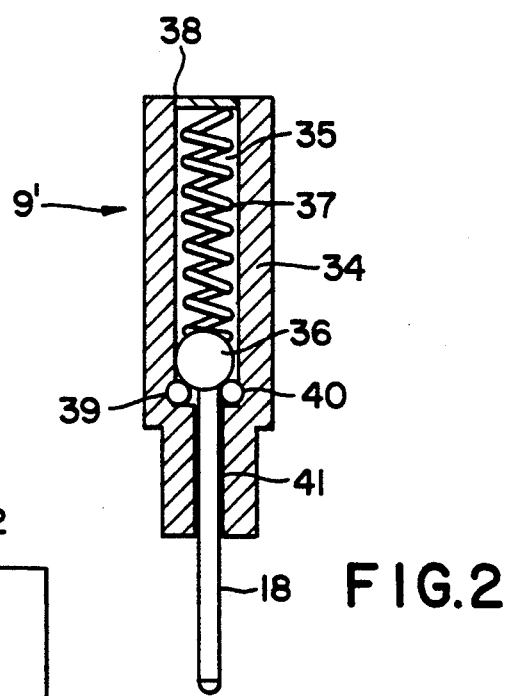
FIG. 2 is a cross-sectional view, with a different scale with respect to that of FIG. 1, of a switch detecting device that can be applied to the head shown in FIG. 1.

As to the head repeatability, it is also important that spring 32 be, under the conditions shown in FIG. 1, coaxial with the longitudinal geometrical axis and that the centre of ball 36 and the intermediate point, in FIG. 2, between bars 39, 40 be aligned along the longitudinal geometrical axis.

For the same purposes, another important feature is the arrangement of bellows 29: according to the conditions shown in figure bellows 29 is coaxial with the longitudinal geometrical axis of the head and the geometrical plane passing through the middle of the bellows is tangential to the upper face 6 of ring 2. In this way bellows 29, when accomplishing measurements in a transversal direction, is essentially only subject to tensile and compression stresses and not, in particular, to cutting stresses. The metal bellows 29 can resist torques arising as a consequence of slidings on the workpiece, in the head assembling phase, in the event the movable arm 12 is replaced, etc. In any case if the torques applied to arm 12 reach excessive values owing to anomalous circumstances, friction device 25 intervenes enabling the mutual rotation between the movable arm-set and bellows 29, thus preventing the latter from undergoing any damage.

Figure 3:
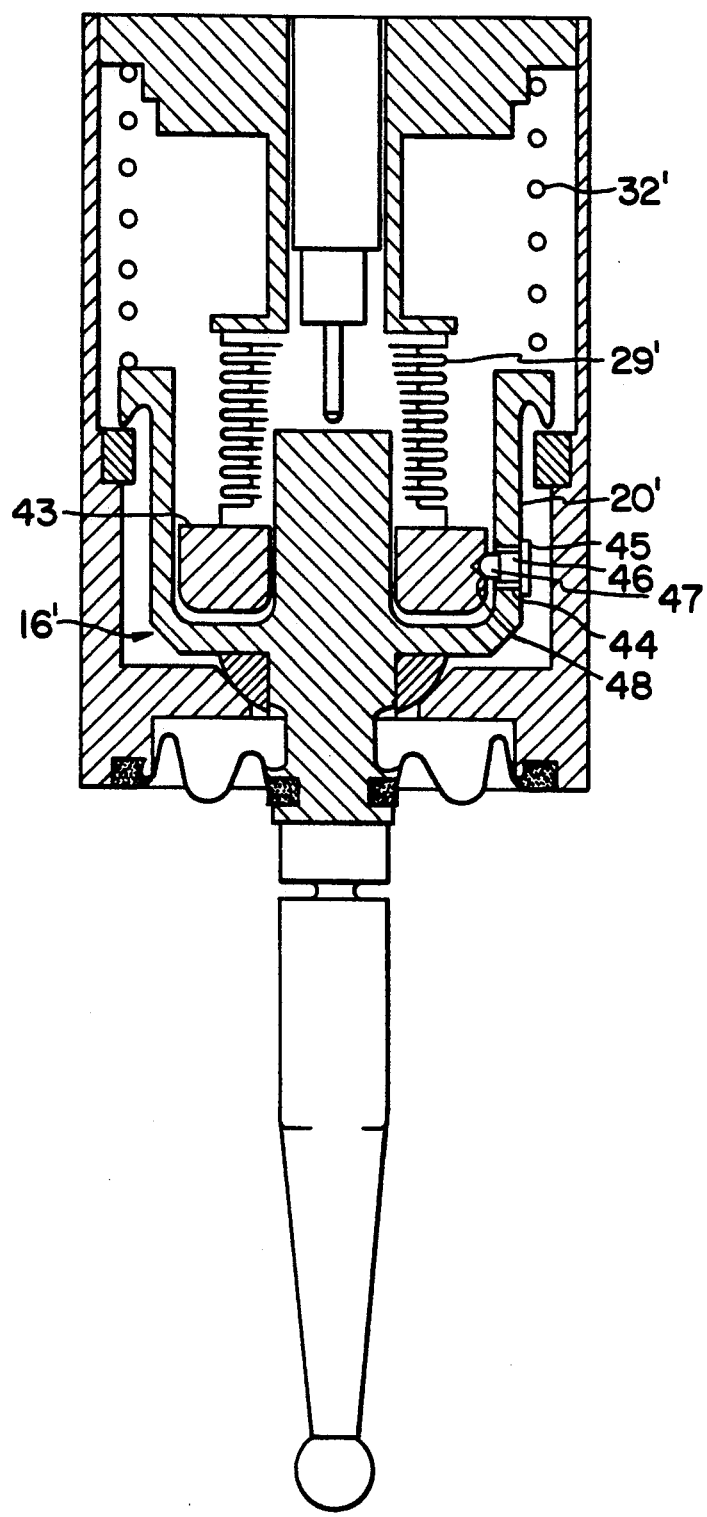
FIG. 3 is a longitudinal cross-sectional view of a measuring head, or a contact detecting head, provided with a different coupling of the antirotation device.

According to the variant shown in FIG. 3 (where identical parts or parts equivalent to those shown in figure I are marked with the same reference numbers and the addition of an apex), the lower end of the metal bellows 29, is rigidly coupled, for example welded, to a substantially cylindrical element 43, housed with small radial clearance at the interior of cylindrical portion 20' of member 16'. Member 16' and portion 20' are similar to those shown in FIG. 1 with the exception of the following. Portion 20' has an opening 44 partially housing a resilient locking device for locking element 43. This device comprises a support plate 45 fixed to portion 20' in a way that has not been shown, a resilient lamina 46 parallel to the plane of the drawing and a spherical reference element 47 that cooperates with a cone-shaped seat 48 formed in element 43.

Pressure spring 32' has, in this case, its lower end directly in contact with the upper end of member 16'. The coupling between element 47 and seat 48 and the resistance to torsional forces of bellows 29' prevent undesired rotations of the movable arm-set. However, in the event that the applied torsional forces reach excessive values, lamina 46 bends thus causing the disengagement of spherical element 47 from seat 48 and consequently the uncoupling of bellows 29' from the movable arm-set. Obviously, opening 44 is sufficiently large in a circumferential direction for housing element 47 when there occurs the unlocking of element 43.

Figure 4:
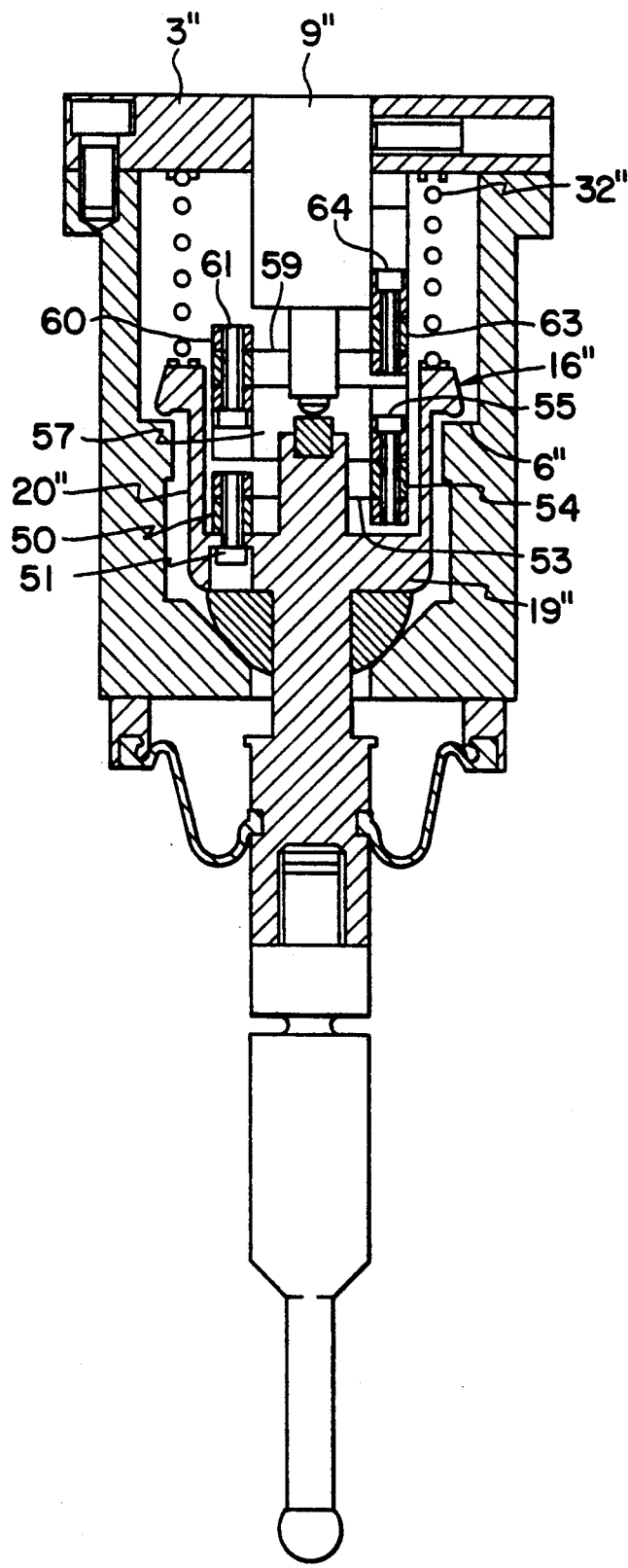
FIG. 4 shows, in a longitudinal cross-sectional view, another variant of a head with a different type of antirotation device.

FIG. 4 partially shows another measuring head or contact detecting head equipped with a different antirotation device. Identical parts or parts that are equivalent to those shown in figure have the same reference numbers with the addition of two apexes.

To base 19" of member 16" there is fixed, by means of a stud 50 and a screw 51, a peripheral edge of an annular resilient lamina 53, arranged—in rest conditions—in a direction that is perpendicular to the longitudinal geometrical axis of the head. The opposite edge of lamina 53 is clamped, by means of a stud 54 and a screw 55, to an intermediate element consisting of a cylindrical bushing 57 inserted with radial clearance within portion 20", coaxially with the longitudinal axis of the head (in the rest conditions shown in the drawing).

Another resilient annular lamina 59, identical to the previous one 53, is arranged at the opposite side of bushing 57 and it has an edge clamped to the bushing by means of a stud 60 and a screw 61. The opposite edge of lamina 59 is clamped to a stud 63, fixed to the closure plate 3", by means of a screw 64.

Under rest Conditions, laminae 53 and 59 are located at opposite sides and at an identical distance from the geometrical plane defined by the annular shoulder 6".

The device comprising annular laminae 53 and 59 and floating bushing 57 accomplishes the same functions as the bellows 29 and 29, shown in FIGS. 1 and 3. In any case, as this device has greater resistance to torsional forces, there are not foreseen means for accomplishing functions equivalent to those of the friction device 25, in FIG. 1, and to those of the resilient locking device, shown in FIG. 3. According to the variant shown in FIG. 4, too, helical spring 32,, has its lower end directly contacting a seat formed in the upper end of member 16".

We claim:

1. A probe for checking linear dimensions of workpieces on machine tools or measuring machines, comprising:
    a support casing, substantially defining a geometrical axis;
    a movable structure including an arm and a feeler, carried at an end of said arm, for touching said workpiece to be checked;
    detecting means carried by said support casing for providing a signal depending on the position of said movable structure with respect to said support casing; and
    reference means for movably positioning said movable structure with respect to said support casing, said reference means including a seat fixed with respect to said support casing; said seat and said reference element being adapted to define, substantially, a determined point lying on said geometrical axis for rotational displacement of the movable structure about said point; a first reference surface, fixed with respect to said support casing and having circular symmetry about said geometrical axis; a second reference surface, fixed with respect to said movable structure and having circular symmetry, said geometrical axis; a second reference surface, fixed with respect to said movable structure and having circular symmetry, said second reference surface being adapted to enter into contact with said first reference surface, substantially with single point-to-point contact, the possible contact points on said first reference surface defining a circumference concentric with said geometrical axis; and thrust means arranged between said support casing and said movable structure for urging said movable structure into contact with said support casing, wherein in the absence of external forces on said arm and feeler said movable structure is supported by said support casing due, basically, to contact between said reference element and said seat, and wherein, upon applying external forces on said feeler, the possible displacements of said movable structure with respect to said support casing include, substantially, mutual rotations about said determined point and mutual rotations about any point of said circumference.

2. The probe according to claim 1, wherein reference element and said seat are adapted to detach from each other and the possible displacements of said movable structure with respect to said support casing include translation displacements along said geometrical axis.

3. The probe according to claim 2, further comprising an antirotational device associated with said support casing and said movable structure, said antirotational device preventing rotation of said movable structure about said geometrical axis and enabling any other displacement of said movable structure.

4. The probe according to claim 3, wherein said antirotational device has a first part rigidly secured to one of said movable structure and support casing and a second portion associated with the other by means of a safety device, for allowing said rotations of said movable structure when a pre-fixed amount of torsional stress, applied to the antirotational device, is reached.

5. The probe according to claim 4, wherein said safety device comprises a friction coupling.

6. The probe according to claim 4, wherein said safety device comprises a resilient locking.

7. The probe according to claim 3, wherein said antirotational device comprises a bellows that is substantially rigid with respect to torsional stresses and wherein, under rest conditions, said bellows is substantially coaxial with respect to said geometrical axis and is arranged lengthwise in a symmetrical position with respect to one of said first and second reference surfaces.

8. The probe according to claim 3, wherein said antirotational device comprises two resilient laminae clamped to said support casing and said movable structure, respectively, and an intermediate element clamped to said resilient laminae.

9. The probe according to claim 2, wherein said detection means provide a switching signal.

10. The probe according to claim 9, wherein said detection means comprise an electric switch with a first and a second set of contacts said two sets of contacts being substantially arranged along said geometrical axis.

11. A probe according to claim 1, wherein said reference element and said seat define a coupling of the cone-ball type.

12. The probe according to claim 1, wherein said detection means are adapted to provide a switching signal in correspondence with a determined eccentricity of the feeler with respect to said geometrical axis.

13. The probe according to claim 1, wherein said thrust means comprise a spring that is substantially coaxial with said geometrical axis.

14. A probe for checking linear dimensions of workpieces on machine tools or measuring machines, comprising:

a support casing, substantially defining a geometrical axis;

a movable structure including an arm and a feeler, carried at an end of said arm, for touching said workpiece to be checked;

detection means carried by said support casing for providing a signal depending on the position of said movable structure with respect to said support casing; and reference means for movably positioning said movable structure with respect to said support casing, said reference means including a seat fixed with respect to said support casing; a reference element fixed with respect to said movable structure, said seat and said reference element being adapted, substantially, to define a spherical hinge permitting rotation of said movable structure about a determined point lying on said geometrical axis and translational displacement of said movable structure along said geometrical axis; a first reference surface fixed with respect to said support casing and featuring circular symmetry about said geometrical axis; a second reference surface, fixed with respect to said support casing and featuring circular symmetry about said geometrical axis; a second reference surface, fixed with respect to said movable structure and featuring circular symmetry, said first and second reference surfaces being adapted to enter into localized point-to-point contact, in correspondence with any point of a circumference of said first reference surface, said circumference being concentric with said geometrical axis; and thrust means arranged between said support casing and said movable structure for urging said reference element into contact with said seat, wherein in the absence of external forces on said arm and feeler said movable structure is supported by said support casing due, basically, to contact between said reference element and said seat, and upon applying external forces on said feeler, the possible displacements of said movable structure with respect to said support casing include mutual rotations about said determined point and mutual rotations about any point of said circumference.

15. A probe for checking linear dimensions of workpieces on machine tools or measuring machines, comprising:

support means defining a longitudinal geometrical axis and including a casing with a support portion and an annular member defining a first reference surface with circular symmetry about said geometrical axis;

a movable structure including an arm, a feeler carried at an end of said arm for touching said workpiece to be checked, a reference element adapted to define, together with said support portion, substantially a detachable spherical hinge permitting rotational displacement of said movable structure about a determined point lying on said geometrical axis and translational displacement along said geometrical axis, and another member defining a second reference surface with circular symmetry, said first reference surface and said second reference surface being adapted to enter into mutual contact substantially at single respective points, the points of possible contact defining a circumference concentric with said geometrical axis;

detection means carried by said support means for providing a signal depending on the position of said movable structure with respect to said casing; and thrust means arranged between said casing and said movable structure for urging said movable structure into contact with said casing, wherein said movable structure is adapted to be supported by said casing due, basically, to contact between said reference element and support portion and wherein the possible displacements of said movable structure with respect to said casing include rotational displacements about said determined point, mutual rotations about any point of said circumference and translational displacements.

16. A probe for checking linear displacements of workpieces, comprising:

support means defining a longitudinal geometrical axis, said support means including a casing with a support portion featuring rotational symmetry and an annular member defining a first reference surface featuring circular symmetry about said longitudinal geometrical axis;

a movable arm-set defining a geometrical symmetrical axis supported by said support means and including a movable arm, a feeler secured to an end of said movable arm, a reference element featuring rotational symmetry about said symmetrical axis and a member defining a second reference surface with circular symmetry, said second reference surface being adapted to enter into point-to-point contact with said first reference surface, and said reference element and said support portion being adapted to define a spherical hinge for mutual rotation of said arm-set with respect to said support means;

thrust means arranged between said casing and said movable arm-set for urging said reference element into contact with said support portion for defining a rest condition of said movable arm-set, in which rest condition said geometrical symmetrical axis substantially lies on said longitudinal geometrical axis and said second reference surface is spaced apart from said first reference surface; and detection means carried by said support means and responsive to the displacement of the movable arm-set from the rest condition.

* * * * *

UNITED STATES PATENT AND TRADEMARK OFFICE
CERTIFICATE OF CORRECTION

PATENT NO. : 5,299,360            Page 1 of 2
DATED       : April 5, 1994
INVENTOR(S) : Possati, deceased et al It is certified that error appears in the above-identified patent and that said Letters Patent is hereby corrected as shown below:

On the title page, item [56],

Under the References Cited, U.S. Patent No. 4,581,826 is missing from the list.
In the Abstract, line 15, after "detection" insert --device--.

Column 2, line 6, delete "according to the prior art portion of claim 1".
Column 2, line 9, change "changes" to --changes.--.
Column 3, line 19, change "filler" to --feeler--.
Column 3, line 52, after "member" insert --1--.
Column 5, line 8, after "stem" insert --17--.
Column 5, line 9, after "figure" insert --1--.
Column 6, line 44, after "figure" insert --1--.
Column 6, line 62, change "I" to --1--.
Column 6, line 64, change "29," to --29'--.
Column 7, line 23, after "figure" insert --1--.
Column 7, line 41, change "Conditions" to --conditions--.
Column 7, line 46, change "29" (second occurrence) to --29'--.
Column 7, line 52, change "32,," to --32"--.

UNITED STATES PATENT AND TRADEMARK OFFICE
CERTIFICATE OF CORRECTION

PATENT NO. : 5,299,360
DATED : April 5, 1994
INVENTOR(S) : Possati, deceased et al It is certified that error appears in the above-identified patent and that said Letters Patent is hereby corrected as shown below:

Claim 1, line 16, after "casing;" insert --a reference element fixed with respect to said movable structure,--.
Claim 1, lines 23-25, delete "a second reference surface, fixed with respect to said movable structure and having circular symmetry, said geometrical axis;".
Claim 2, line 1, after "wherein" insert --said--.
Claim 9, lines 1-2, change "detection" to --detecting--.
Claim 10, line 2, change "detection" to --detecting--.
Claim 10, line 3, change "contacts" (first occurrence) to --contacts,--.
Claim 12, line 2, change "detection" to --detecting--.
Claim 14, lines 26-28, delete "a second reference surface, fixed with respect to said support casing and featuring circular symmetry about said geometrical axis;".

Signed and Sealed this

Thirtieth Day of March, 1999

Attest:

Q. TODD DICKINSON

*Attesting Officer*  *Acting Commissioner of Patents and Trademarks*